(12) United States Patent
Tsai et al.

(10) Patent No.: US 8,218,298 B2
(45) Date of Patent: Jul. 10, 2012

(54) DOOR MECHANISM WITH A RETRACTABLE FUNCTION AND RELATED ELECTRONIC DEVICE

(75) Inventors: Yu-Han Tsai, Taipei Hsien (TW); Chun-Wang Lin, Taipei Hsien (TW); Yu-Hsien Huang, Taipei Hsien (TW); Yi-Chen Li, Taipei Hsien (TW); Chi-Jen Lo, Taipei Hsien (TW); Feng-Hsiung Wu, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 259 days.

(21) Appl. No.: 12/828,250

(22) Filed: Jun. 30, 2010

(65) Prior Publication Data

US 2011/0141669 A1  Jun. 16, 2011

(30) Foreign Application Priority Data

Dec. 10, 2009  (TW) ................................ 98223155 U (51) Int. Cl.
*H05K 5/00* (2006.01)
*H05K 7/00* (2006.01)
(52) U.S. Cl. .......... 361/679.01; 361/679.55; 361/679.56

(58) Field of Classification Search ............. 361/679.01, 361/679.37, 679.55, 679.56
See application file for complete search history.

(56) References Cited

U.S. PATENT DOCUMENTS

| | | | | |
|---|---|---|---|---|
| 5,595,074 | A * | 1/1997 | Munro | 70/58 |
| 5,645,261 | A * | 7/1997 | Glynn | 248/551 |
| 6,490,154 | B2 * | 12/2002 | Thompson | 361/679.41 |
| 6,836,406 | B2 * | 12/2004 | Weng et al. | 361/679.38 |
| 7,639,492 | B2 * | 12/2009 | Thomas et al. | 361/679.37 |
| 2007/0235492 | A1 * | 10/2007 | Sirichai et al. | 224/930 |

* cited by examiner

*Primary Examiner* — Anthony Haughton
(74) *Attorney, Agent, or Firm* — Winston Hsu; Scott Margo (57) ABSTRACT

A door mechanism includes a main body whereon an opening is formed. The main body is for shielding a slot on a casing of an electronic device. The door mechanism further includes a first resilient component. One end of the first resilient component is fixed inside the main body. The door mechanism further includes a shaft including a pivoting portion pivoted to the casing of the electronic device so that the main body is capable of rotating relative to the casing. The shaft further includes an extending portion. One end of the extending portion is connected to the pivoting portion, and the other end of the extending portion passes through the opening and is connected to the other end of the first resilient component. The main body is capable of moving relative to the pivoting portion due to deformation of the first resilient component.

20 Claims, 7 Drawing Sheets

DOOR MECHANISM WITH A RETRACTABLE FUNCTION AND RELATED ELECTRONIC DEVICE

BACKGROUND OF THE INVENTION

1. Field of the Invention

The present invention relates to a door mechanism and a related electronic device, and more specifically, to a door mechanism with a retractable function and a related electronic device.

2. Description of the Prior Art

A computer capable of being disassembled easily preferably matches a user's demand in order to disassemble broken components for detecting and replacing or to disassemble old-type components for updating. A storage device, such as a hard disk, is a necessary component of the computer. Therefore, it is very important for users to assemble and disassemble the storage device conveniently. For example, as for mechanical design of Ultra Mobile PC (UMPC), a slot for a removable hard disk and the memory card reader are usually disposed on a front case of the computer for convenient assembly. However, there are some drawbacks in aforesaid devices. Dust or foreign particles might get into the computer via the slot, and there is a safety concern of easy removability. Therefore, a door mechanism is designed for covering the slot of the removable hard disk on the case so as to avoid dust and theft. Because of the limited space, a conventional door mechanism interferes with neighboring connectors, such as USB connectors, etc., in the over large movement when the door is opening, and results in inconvenience of connecting other external devices. Therefore, it is an important issue how to design a door mechanism for preventing the interference and improving the convenience of operation.

SUMMARY OF THE INVENTION

The present invention provides a door mechanism with a retractable function and a related electronic device to solve the problems mentioned above.

According to the claimed invention, a door mechanism with retractable function comprises a main body, a first resilient component and a shaft. The main body is for shielding a slot on a casing of an electronic device, and an opening formed on the main body. One end of the first resilient component is fixed inside the main body. The shaft further comprises a pivoting portion and an extending portion. The pivoting portion is pivoted to the casing of the electronic device for driving the main body to rotate relative to the casing. One end of the extending portion is connected to the pivoting portion and the other end of the extending portion is passing through the opening and connected to the other end of the first resilient component, wherein the main body moves relative to the pivoting portion with deformation of the first resilient component.

According to the claimed invention, the pivoting portion is sheathed on a protruding structure of the casing.

According to the claimed invention, the extending portion is made of flexible material.

According to the claimed invention, a protrusion is formed on an inner side of the main body for stopping the first resilient component.

According to the claimed invention, the first resilient component is a spring.

According to the claimed invention, the door mechanism further comprises a pulling rod, a locking component and a second resilient component. The pulling rod is connected to the main body in a rotatable manner. One side of the locking component protrudes out of a groove of the main body in a sliding manner. One end of the second resilient component is fixed to an inner side of the main body, and the other end of the second resilient component is connected to the locking component so as to push the locking component to lock one end of the pulling rod.

According to the claimed invention, the other end of the pulling rod is for engaging inside a hole of the casing so as to lock the door mechanism on the casing.

According to the claimed invention, the door mechanism further comprises a third resilient component for contacting against a side of the pulling rod and for pushing the pulling rod to rotate out of the main body.

According to the claimed invention, the third resilient component is a clip.

According to the claimed invention, the door mechanism further comprises a shock-absorbing component disposed on a side of the main body facing the slot of the casing for contacting a removable module installed inside the casing so as to absorb shock of the removable module.

According to the claimed invention, an electronic device comprises a casing, a removable module and a door mechanism. A slot is formed on the casing. The removable module is installed inside the casing through the slot. The door mechanism for shielding the slot of the casing comprises a main body, a first resilient component and a shaft. The main body is for shielding the slot. An opening is formed on the main body. One end of the first resilient component is fixed inside the main body. The shaft comprises a pivoting portion and an extending portion. The pivoting portion is pivoted to the casing for driving the main body to rotate relative to the casing. One end of the extending portion is connected to the pivoting portion, and the other end of the extending portion is passing through the opening and is connected to the other end of the first resilient component, wherein the main body moves relative to the pivoting portion with deformation of the first resilient component.

According to the claimed invention, the removable module is a hard disk.

According to the claimed invention, the electronic device is an Ultra Mobile PC (UMPC).

These and other objectives of the present invention will no doubt become obvious to those of ordinary skill in the art after reading the following detailed description of the preferred embodiment that is illustrated in the various figures and drawings.

DETAILED DESCRIPTION

Figure 1:
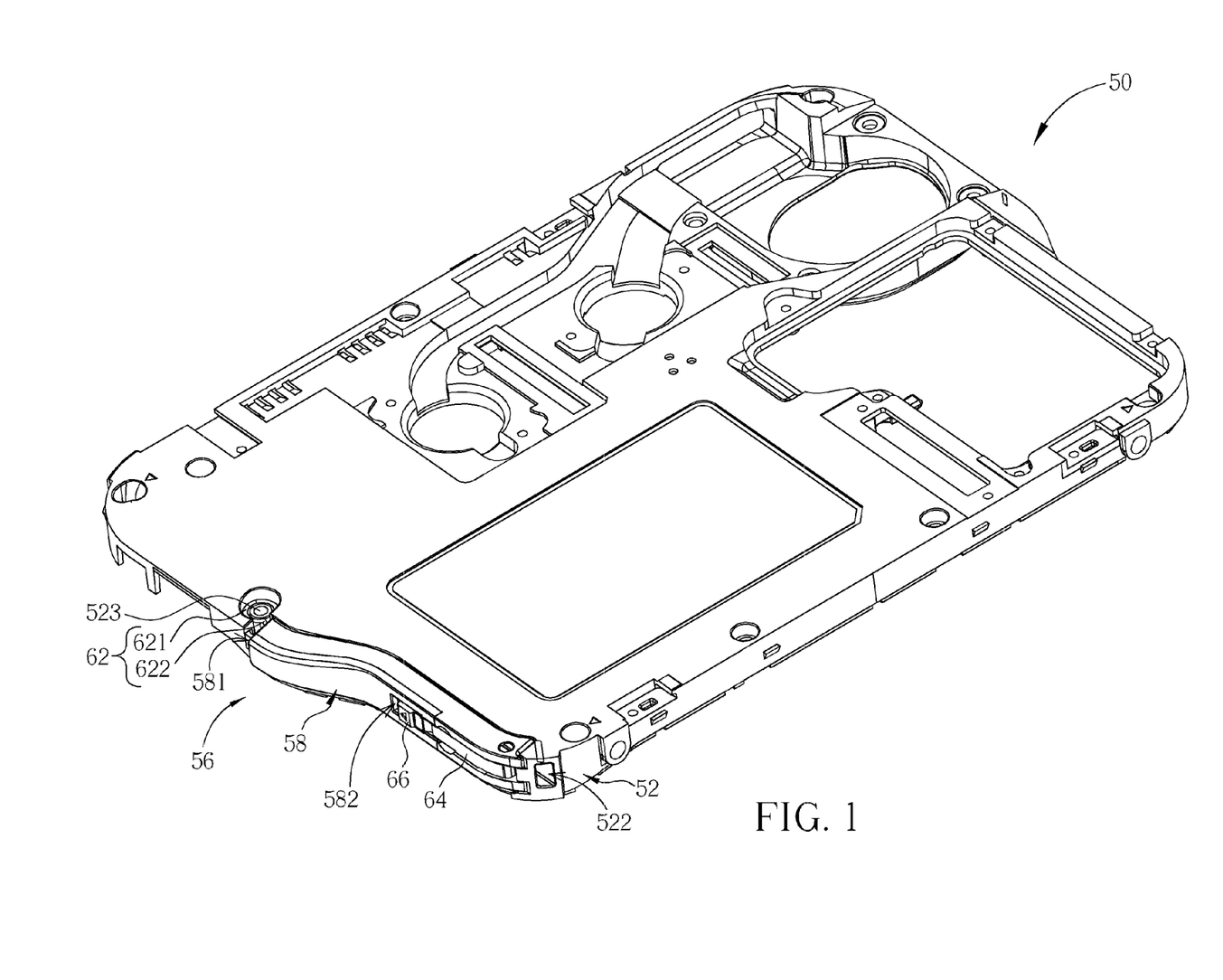
FIG. 1 to FIG. 3 are schematic diagrams of an electronic device in different states according to the preferred embodiment of the present invention.
Figure 2:
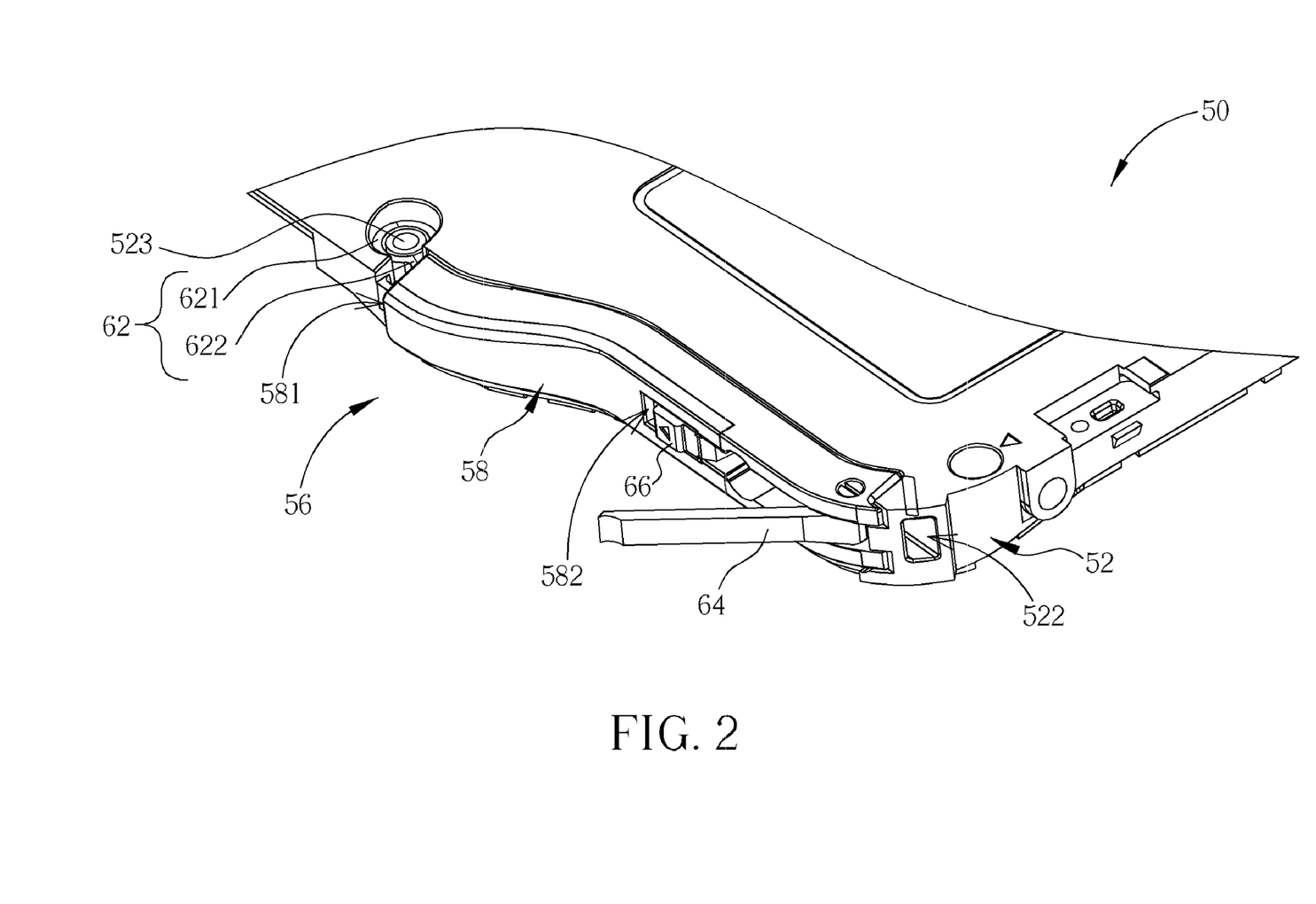
Figure 3:
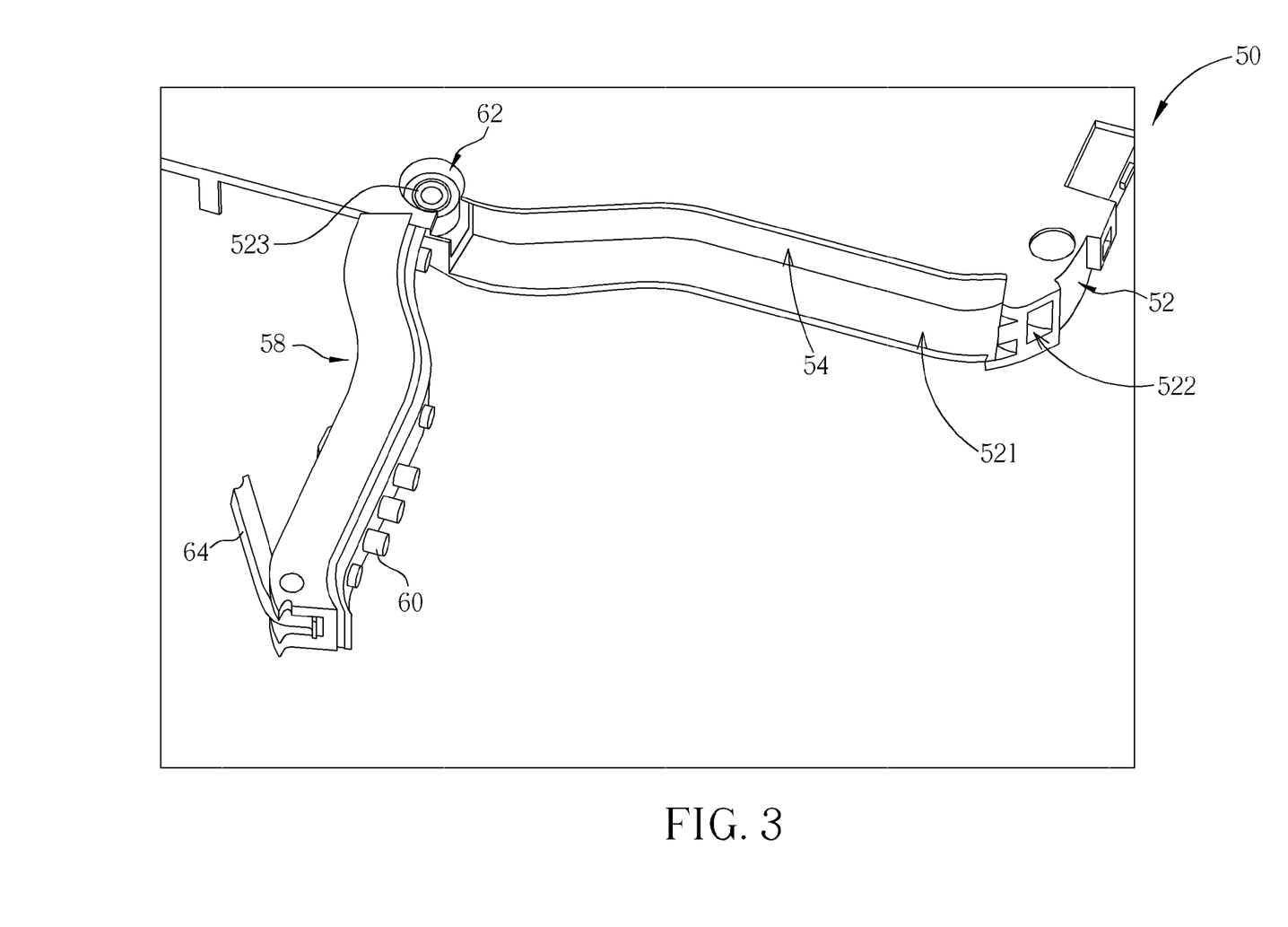

Please refer to FIG. 1 to FIG. 3. FIG. 1 to FIG. 3 are schematic diagrams of an electronic device 50 in different states according to the preferred embodiment of the present invention. The electronic device 50 can be a portable computer, such as a laptop PC or an Ultra Mobile PC (UMPC), etc. The electronic device 50 includes a casing 52 for shielding inner components. A slot 521 and a hole 522 are formed on the casing 52. The electronic device 50 further includes a removable module 54 installed inside the casing 52 through the slot 521. The removable module 54 can be a storage module, such as a Solid State Drive (SSD), etc.

The electronic device 50 further includes a door mechanism 56 for shielding a slot 521 of the casing 52 to avoid dust and theft. The door mechanism 56 includes a main body 58 for shielding the slot 521 of the casing 52. An opening 581 is formed on one end of the main body 58, and a groove 582 is formed on another end of the main body 58. Furthermore, at least one shock-absorbing component 60 is disposed on a side of the main body 58 facing the slot 521 of the casing 52 for contacting the removable module 54 installed inside the casing 52 so as to absorb shock of the removable module 54. The shock-absorbing component 60 can be made of rubber or plastic material. The door mechanism 56 further includes a shaft 62. The shaft 62 includes a pivoting portion 621 pivoted to the casing 52. For example, the pivoting portion 621 can be sheathed on a protruding structure 523 of the casing 52 for driving the door mechanism 56 to rotate relative to the casing 50. That is, the door mechanism 56 can be rotated from a position shielding the slot 521 as shown in FIG. 1 to a position without shielding the slot 521 as shown in FIG. 3. The shaft 62 further includes an extending portion 622. One end of the extending portion 622 is connected to the pivoting portion 621, and the other end of the extending portion 622 passes through the opening 581 on the main body 58. The extending portion 622 can be made of flexible material. The door mechanism 56 further includes a pulling rod 64 connected to the main body 58 in a rotatable manner, as shown in FIG. 2. Users can pull the pulling rod 64 when the pulling rod 64 is rotating out of the main body 58 for rotating the main body 58 out of the casing 52 as shown in FIG. 3. The door mechanism 56 further includes a locking component 66. One side of the locking component 66 protrudes out of a groove 582 of the main body 58 in a sliding manner. The locking component 66 is for locking one end of the pulling rod 64 so as to fix the pulling rod 64 inside the main body 58. When the pulling rod 64 is locked inside the main body 58 by the locking component 66, the other end of the pulling rod 64 is engaging inside the hole 522 of the casing 52 so as to lock the door mechanism 56 on the casing 52.

Figure 4:
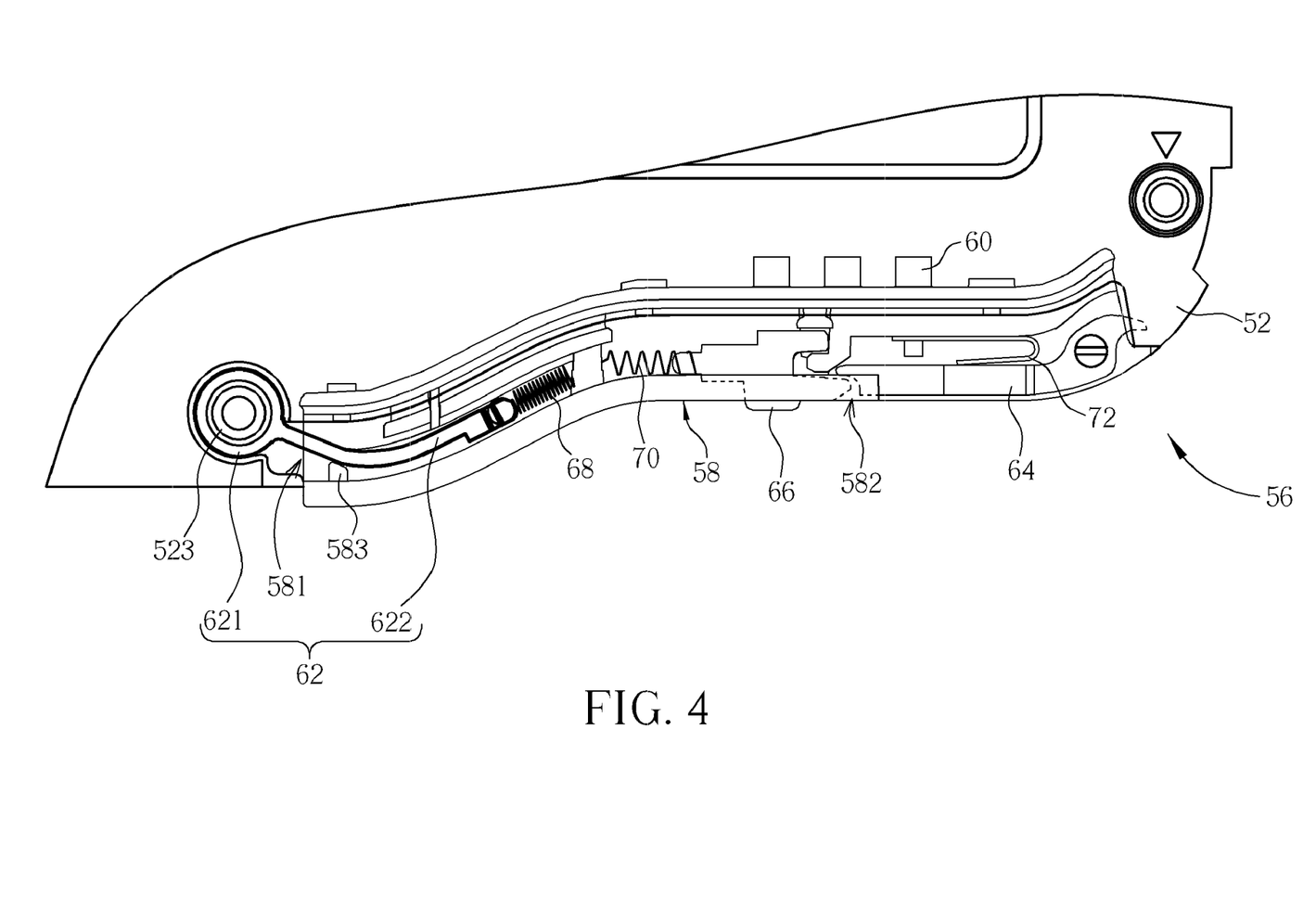
FIG. 4 to FIG. 7 are schematic diagrams of inner structure of a door mechanism in different states according to the preferred embodiment of the present invention.
Figure 5:
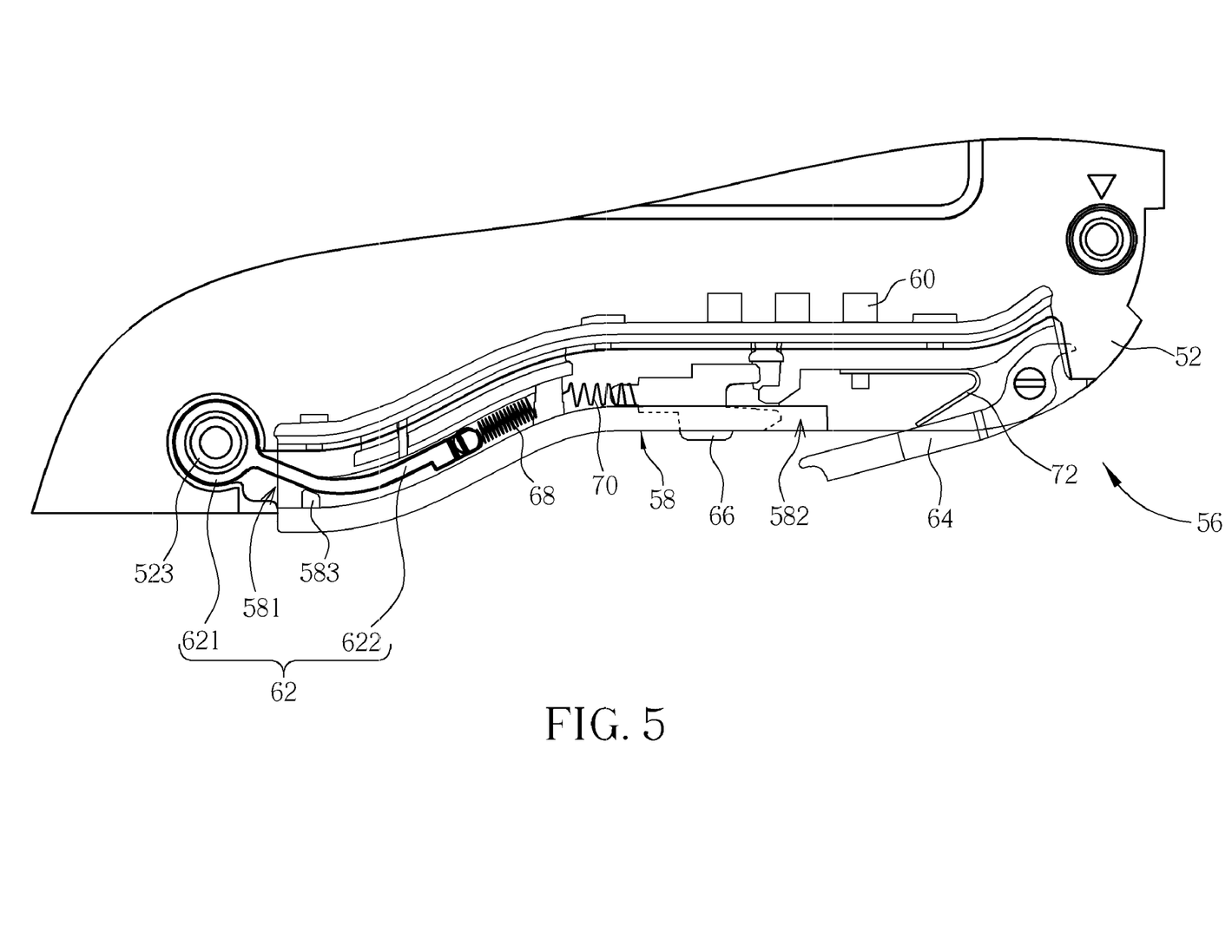

Please refer to FIG. 4 to FIG. 7. FIG. 4 to FIG. 7 are schematic diagrams of inner structure of the door mechanism 56 in different states according to the preferred embodiment of the present invention. The door mechanism 56 further includes a first resilient component 68. One end of the first resilient component 68 is fixed inside the main body 58, and the other end of first resilient component 68 is connected to the other end of the extending portion 622 passing through the opening 581. The first resilient component 68 can be a stretching spring. A protrusion 583 is formed on an inner side of the main body 58 for stopping the first resilient component 68 to avoid the fatigue or the damage of the over stretching the first resilient component 68 beyond its elastic limit. The door mechanism 56 further includes a second resilient component 70. One end of the second resilient component 70 is fixed to an inner side of the main body 58, and the other end of the second resilient component 70 is connected to the locking component 66 so as to push the locking component 66 to lock one end of the pulling rod 64. The second resilient component 70 can be a compression spring. The door mechanism 56 further includes a third resilient component 72 for contacting against a side of the pulling rod 64 and for pushing the pulling rod 64 to rotate out of the main body 58. The third resilient component 72 can be a clip. As shown in FIG. 4, when the pulling rod 64 is locked inside of the main body 58 by the locking component 66, the side of the pulling rod 64 is contacting against the third resilient component 72. The second resilient component 70 provides an elastic force for the locking component 66 to lock the end of the pulling rod 64 firmly. As shown in FIG. 5, when the user slides a side of the locking component 66 protruding out of the groove 582 to unlock the pulling rod 64 from the locking component 66, the third resilient component 72 provides a recovering elastic force for the pulling rod 66 to push the pulling rod 64 to rotate out of the main body 58. Simultaneously, the locking component 66 compresses the second resilient component 70. When the user releases the locking component 66, a recovering elastic force provided by the second resilient 70 pushes the locking component 66 back to the original position as shown in FIG. 3.

Figure 6:
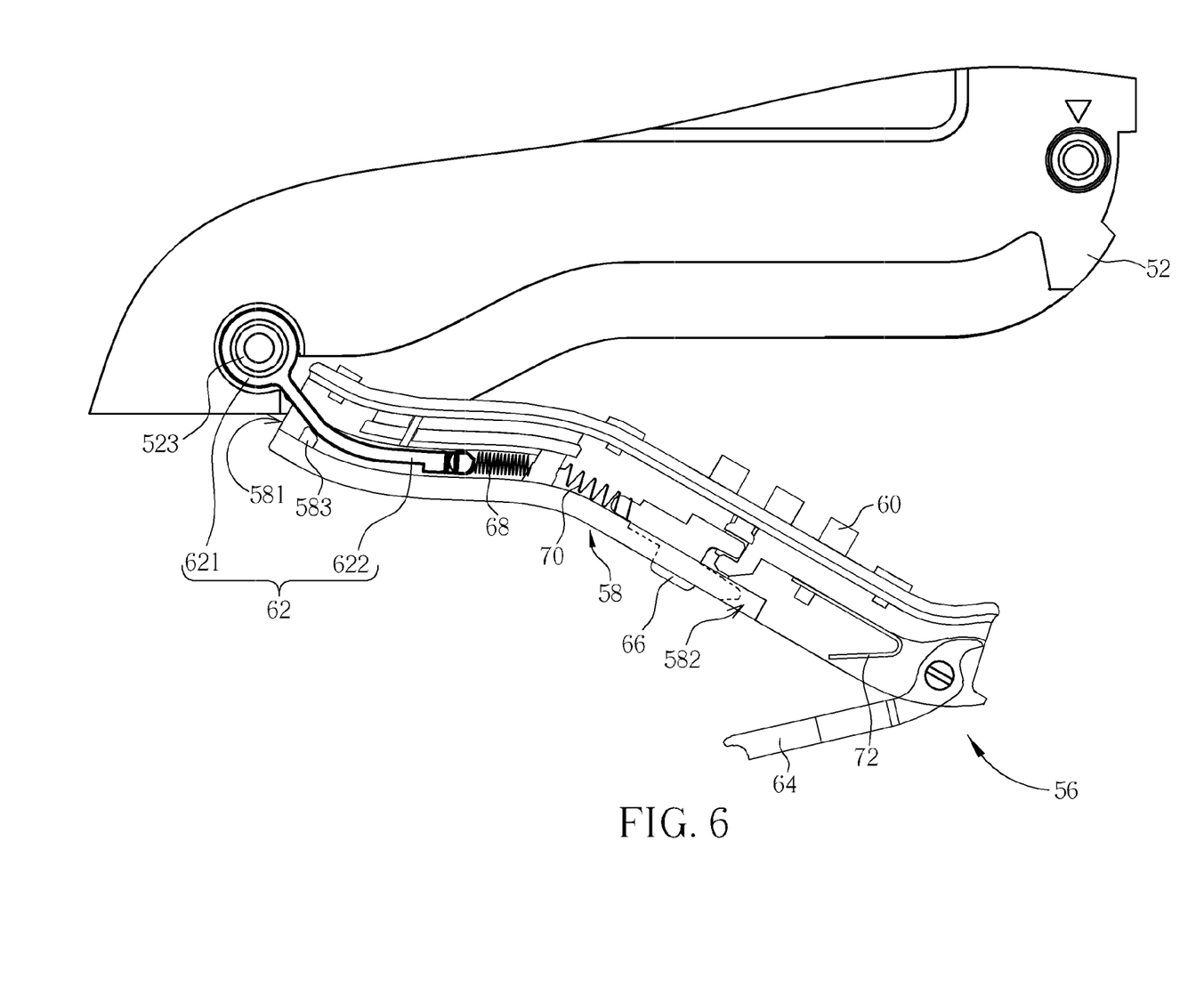
Figure 7:
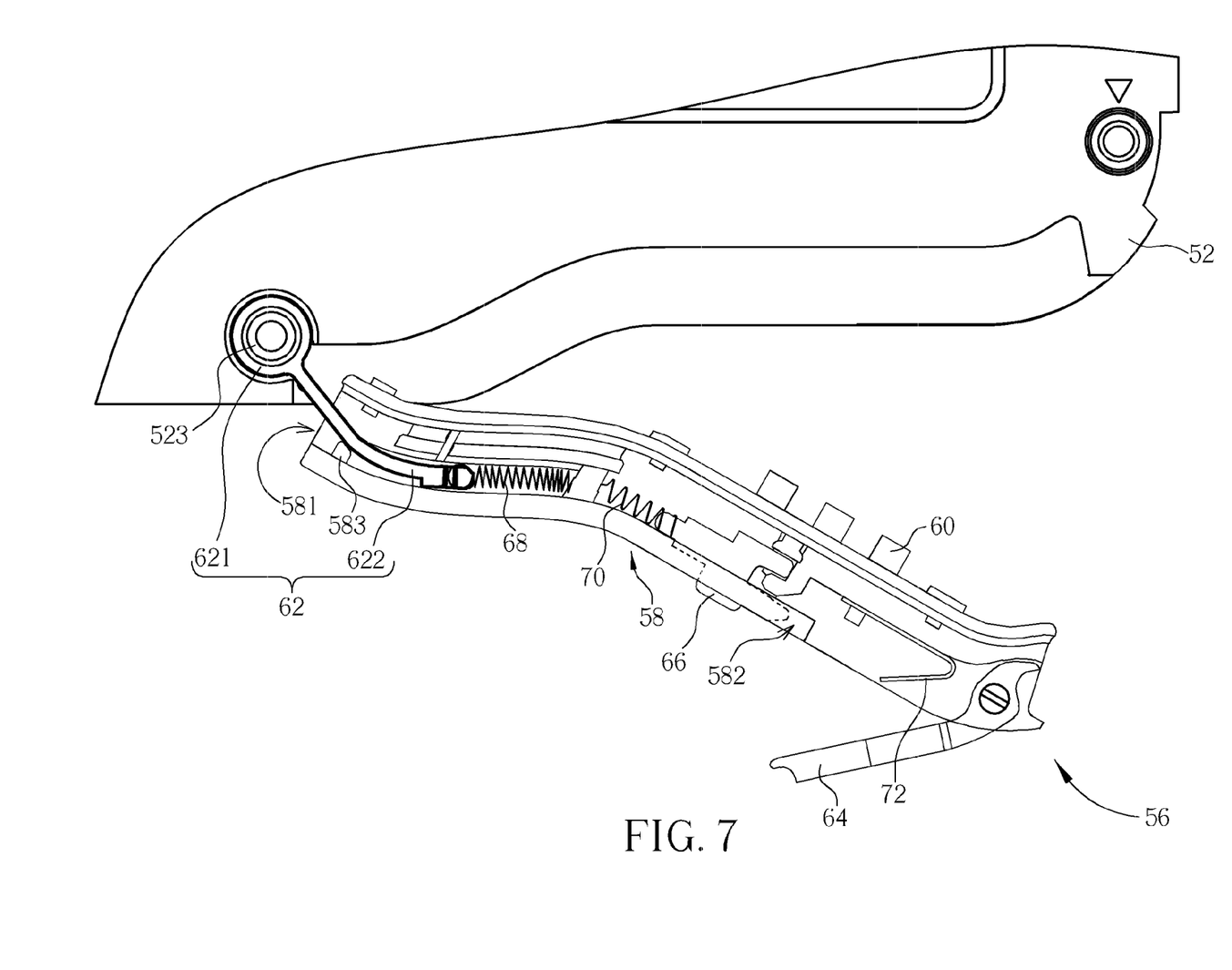

Please refer to FIG. 6. When the pulling rod 64 rotates out of the main body 58, the user can pull the pulling rod 64 to rotate the main body 58 to the position out of the casing 52, as shown in FIG. 3. The rotating angle of the main body 58 depends on the degree of freedom of the shaft 62. The pulling rod 64 not only acts as the mechanism of fixing the door mechanism 56 on the casing 52 but also as the means of imposing force for pulling the door mechanism 56. To avoid interference with the neighboring connectors, such as a USB connector, by the opening movement of the door mechanism 56 so as to improve inconvenience of connecting other external devices, as shown in FIG. 7, the user can pull the main body 58 to make the first resilient component 68 in the state of tension. In other words, the main body 58 moves relative to the pivoting portion 621 with deformation of the first resilient component 68 so as to avoid interference of mechanical space and to increase the convenience of operation by stretching the distance from the main body 58 to the pivoting portion 621. Because of solving the drawbacks of the conventional door mechanism, the rotating distance of the door mechanism 56 of the present invention can be increased to let users remove the removable module 54 conveniently. When the user releases the main body 58, the recovering force provided by the first resilient component 68 drives the main body 58 back to the original position. Afterward, the user can engage the main body 58 on the casing 52.

Compared to the prior art, the door mechanism with a retractable function and the related electronic device of the present invention can improve interference with the neighboring connectors due to the opening distance of the conventional door mechanism and the inconvenience of connecting other external devices. Because of increasing the rotating distance of the door mechanism in the present invention, users can remove the removable module conveniently so as to enhance the ease of the operation greatly.

Those skilled in the art will readily observe that numerous modifications and alterations of the device and method may be made while retaining the teachings of the invention.

What is claimed is:
1. A door mechanism comprising:
a main body for shielding a slot on a casing of an electronic device, an opening being formed on the main body;
a first resilient component, one end of the first resilient component being fixed inside the main body; and
a shaft comprising:
a pivoting portion pivoted to the casing of the electronic device for driving the main body to rotate relative to the casing; and
an extending portion, one end of the extending portion being connected to the pivoting portion, and the other end of the extending portion passing through the opening and being connected to the other end of the first resilient component, wherein the main body moves relative to the pivoting portion with deformation of the first resilient component.

2. The door mechanism of claim 1, wherein the pivoting portion is sheathed on a protruding structure of the casing.

3. The door mechanism of claim 1, wherein the extending portion is made of flexible material.

4. The door mechanism of claim 1, wherein a protrusion is formed on an inner side of the main body for stopping the first resilient component.

5. The door mechanism of claim 1, wherein the first resilient component is a spring.

6. The door mechanism of claim 1 further comprising:
a pulling rod connected to the main body in a rotatable manner;
a locking component, one side of the locking component protruding out of a groove of the main body in a sliding manner; and
a second resilient component, one end of the second resilient component being fixed to an inner side of the main body, and the other end of the second resilient component being connected to the locking component so as to push the locking component to lock one end of the pulling rod.

7. The door mechanism of claim 6, wherein the other end of the pulling rod is for engaging inside a hole of the casing so as to lock the door mechanism on the casing.

8. The door mechanism of claim 6 further comprising a third resilient component for contacting against a side of the pulling rod and for pushing the pulling rod to rotate out of the main body.

9. The door mechanism of claim 8, wherein the third resilient component is a clip.

10. The door mechanism of claim 1, further comprising a shock-absorbing component disposed on a side of the main body facing the slot of the casing for contacting a removable module installed inside the casing so as to absorb shock of the removable module.

11. An electronic comprising:
a casing, whereon a slot is formed;
a removable module installed inside the casing through the slot; and
a door mechanism for shielding the slot of the casing comprising:
a main body for shielding the slot, an opening being formed on the main body;
a first resilient component, one end of the first resilient component being fixed inside the main body; and
a shaft comprising:
a pivoting portion pivoted to the casing for driving the main body to rotate relative to the casing; and
an extending portion, one end of the extending portion connecting to the pivoting portion, and the other end of the extending portion passing through the opening and being connected to the other end of the first resilient component, wherein the main body moves relative to the pivoting portion with deformation of the first resilient component.

12. The electronic device of claim 11, wherein the pivoting portion is sheathed on a protruding structure of the casing.

13. The electronic device of claim 11, wherein the extending portion is made of flexible material.

14. The electronic device of claim 11, wherein a protrusion is formed on an inner side of the main body for stopping the first resilient component.

15. The electronic device of claim 11, wherein the first resilient component is a spring.

16. The electronic device of claim 11, wherein the door mechanism further comprises:
a pulling rod connected to the main body in a rotatable manner;
a locking component, one side of the locking component protruding out of a groove of the main body in a sliding manner; and
a second resilient component, one end of the second resilient component being fixed to an inner side of the main body, and the other end of the second resilient component being connected to the locking component so as to push the locking component to lock one end of the pulling rod.

17. The electronic device of claim 16, wherein the other end of the pulling rod is for engaging inside a hole of the casing so as to lock the door mechanism on the casing.

18. The electronic device of claim 16, wherein the door mechanism further comprises a third resilient component for contacting against a side of the pulling rod and for pushing the pulling rod to rotate out of the main body.

19. The electronic device of claim 18, wherein the third resilient component is a clip.

20. The electronic device of claim 11, further comprising a shock-absorbing component disposed on a side of the main body facing the slot of the casing for contacting the removable module installed inside the casing so as to absorb shock of the removable module.

* * * * *